US012087196B2

(12) United States Patent
Shi

(10) Patent No.: US 12,087,196 B2
(45) Date of Patent: Sep. 10, 2024

(54) GATE DRIVING CIRCUIT, DISPLAY PANEL, AND DISPLAY DEVICE

(71) Applicant: TCL CHINA STAR OPTOELECTRONICS TECHNOLOGY CO., LTD., Guangdong (CN)

(72) Inventor: Wenbo Shi, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/758,979

(22) PCT Filed: Jun. 30, 2022

(86) PCT No.: PCT/CN2022/103084

§ 371 (c)(1),
(2) Date: Jul. 17, 2022

(87) PCT Pub. No.: WO2023/240708

PCT Pub. Date: Dec. 21, 2023

(65) Prior Publication Data

US 2024/0194105 A1 Jun. 13, 2024

(30) Foreign Application Priority Data

Jun. 15, 2022 (CN) ......................... 202210677114.4

(51) Int. Cl.
*G09G 3/00* (2006.01)
*G09G 3/20* (2006.01)

(52) U.S. Cl.
CPC ....... *G09G 3/20* (2013.01); *G09G 2310/0251* (2013.01); *G09G 2310/0267* (2013.01)

(58) Field of Classification Search
CPC ................... G09G 3/3677; G09G 3/20; G09G 2310/0251; G09G 2310/0267; G06F 3/038; H03K 3/00
See application file for complete search history.

(56) References Cited

U.S. PATENT DOCUMENTS

2007/0001953 A1 1/2007 Jang
2012/0139883 A1* 6/2012 Lee ...................... G09G 3/3677 327/108

FOREIGN PATENT DOCUMENTS

CN 104064158 A 9/2014
CN 105845092 A 8/2016

(Continued)

OTHER PUBLICATIONS

International Search Report in International application No. PCT/CN2022/103084,mailed on Dec. 21, 2022.

(Continued)

*Primary Examiner* — Michael A Faragalla
(74) *Attorney, Agent, or Firm* — PV IP PC; Wei Te Chung

(57) ABSTRACT

A gate driving circuit, a display panel, and a display device are disclosed. The gate driving circuit includes a plurality of gate driving units. At least one gate driving unit includes a second transistor configured to transmit a first voltage signal to a second node of the gate driving unit of the current stage according to a potential of a first node of the gate driving unit in a previous stage before transmitting a pre-charge signal to the first node of the gate driving unit in the current stage. Both the display panel and the display device include gate driving circuits.

20 Claims, 3 Drawing Sheets

(56) References Cited

FOREIGN PATENT DOCUMENTS

| | | | |
|---|---|---|---|
| CN | 106251818 | A | 12/2016 |
| CN | 106448592 | A | 2/2017 |
| CN | 107863074 | A | 3/2018 |
| CN | 108536334 | A | 9/2018 |
| CN | 108665865 | A | 10/2018 |
| CN | 108831400 | A | 11/2018 |
| CN | 109036306 | A | 12/2018 |
| CN | 110097861 | A | 8/2019 |
| CN | 111986605 | A | 11/2020 |
| CN | 112382249 | A | 2/2021 |
| IN | 109493783 | A | 3/2019 |
| WO | 2021179384 | A1 | 9/2021 |
| WO | 2021248614 | A1 | 12/2021 |

OTHER PUBLICATIONS

Written Opinion of the International Search Authority in International application No. PCT/CN2022/103084, mailed on Dec. 21, 2022.

Chinese Office Action issued in corresponding Chinese Patent Application No. 202210677114.4 dated Dec. 28, 2022, pp. 1-8.

* cited by examiner

GATE DRIVING CIRCUIT, DISPLAY PANEL, AND DISPLAY DEVICE

FIELD OF THE DISCLOSURE

The present application relates to the technical field of display technologies, and more particularly, to a gate driving circuit, a display panel, and a display device.

BACKGROUND

In a gate driving unit as shown in FIG. 1, in the process of pre-charge of a point Q, if a potential drop rate at a point K is slow, there may be a coincident voltage value VOL in the process of a potential rise at the point Q and the potential drop at the point K, if the coincidence voltage value VOL is large, a transistor T1 may be turned on, affecting a pre-charge effect of the potential of the point Q.

SUMMARY

Technical Problem

Embodiments of the present application provide a gate driving circuit, a display panel, and a display device, which can improve a pre-charge effect that affects a potential of a first node due to a large coincidence voltage value during a potential rise of the first node and a potential drop of a second node.

Technical Solution

Embodiments of the present application provide a gate drive circuit comprising a plurality of cascaded gate driving units. At least one of the gate driving units comprises a pull-up control module, a node pull-down maintaining module, and an inverter module.

The pull-up control module is configured to transmit a pre-charge signal received by a pre-charge signal terminal of the gate driving unit in a current stage to a first node of the gate driving unit in the current stage according to a start-up control signal received by a startup signal terminal of the gate driving unit in the current stage.

The node pull-down maintaining module is electrically connected to a first voltage terminal, the first node of the gate driving unit in the current stage, and a second node of the gate driving unit in the current stage; wherein the node pull-down maintaining module comprises a first transistor, the first transistor is configured to transmit a first voltage signal supplied by the first voltage terminal to the first node of the gate driving unit in the current stage according to a potential of the second node of the gate driving unit in the current stage.

The inverter module is electrically connected to the first voltage terminal, the second node of the gate driving unit in the current stage, and the first node of the gate driving unit in a previous stage; wherein the inverter module comprises a second transistor, the second transistor is configured to transmit the first voltage signal supplied by the first voltage terminal to the second node of the gate driving unit in the current stage according to a potential of the first node of the gate driving unit in the previous stage before transmitting the pre-charge signal to the first node of the gate driving unit in the current stage.

Optionally, in some embodiments of the present application, the second transistor is configured to transmit the first voltage signal supplied by the first voltage terminal to the second node of the gate driving unit in the current stage according to the potential of the first node of the gate driving unit in first two stage.

Optionally, in some embodiments of the present application, the start-up control signal is a staging signal of first six stage of the gate driving unit, the pre-charge signal is a scan signal output by an output terminal of the gate driving unit in the first six stage, the pull-up control module comprises a third transistor, the third transistor is configured to transmit the scan signal output by the output terminal of the gate driving unit in the first six stage to the first node of the gate driving unit in the current stage according to the staging signal of the gate drive unit in the first six stage.

Optionally, in some embodiments of the present application, the node pull-down maintaining module is further electrically connected to the output terminal of the gate driving unit in the current stage, the node pull-down maintaining module further comprises a fourth transistor, the fourth transistor is configured to transmit the first voltage signal supplied by the first voltage terminal to the output terminal of the gate driving unit of the current stage according to a potential of the second node of the gate driving unit in the current stage.

Optionally, in some embodiments of the present application, the inverting module is further electrically connected to a second voltage terminal, the inverting module further comprises a fifth transistor, a sixth transistor, and a seventh transistor; the fifth transistor is configured to transmit the first voltage signal supplied by the first voltage terminal to a gate of the seventh transistor and one of a source and a drain of the sixth transistor according to the potential of the first node of the gate driving unit in the current stage, the sixth transistor is configured to transmit a second voltage signal supplied by the second voltage terminal to the gate of the seventh transistor according to the second voltage signal supplied by the second voltage terminal, and the sixth transistor is configured to transmit the second voltage signal supplied by the second voltage terminal to the second node through the seventh transistor.

Optionally, in some embodiments of the present application, each of the gate driving units further comprises a pull-up module, a staging module, a pull-down module, and a bootstrap module.

The pull-up module is electrically connected to a clock signal line, the first node of the gate driving unit in the current stage, and the output terminal of the gate driving unit of the current stage and configured to output the scan signal through the output terminal of the gate driving unit in the current stage according to the potential of the first node of the gate driving unit in the current stage and a clock signal transmitted by the clock signal line.

The staging module is electrically connected to the clock signal line, the first node of the gate driving unit in the current stage, and a staging signal terminal of the gate driving unit in the current stage and configured to provide the staging signal to a start-up signal terminal of the gate driving unit in a subsequent stage through the staging signal terminal of the gate driving unit in the current stage according to the potential of the first node of the gate driving unit in the current stage and the clock signal transmitted by the clock signal line.

The pull-down module is electrically connected to the first voltage terminal, the first node of the gate driving unit in the current stage, the output terminal of the gate driving unit in the current stage, and the output terminal of the gate driving unit in the subsequent stage and configured to transmit the first voltage signal supplied by the first voltage terminal to the first node of the gate driving unit in the current stage and the output terminal of the gate driving unit in the current stage according to the scan signal output by the output terminal of the gate driving unit in the subsequent stage.

The bootstrap module is electrically connected to the first node of the gate driving unit in the current stage and the output terminal of the gate driving unit in the current stage and configured to bootstrap the potential of the first node of the gate driving unit in the current stage.

Optionally, in some embodiments of the present application, the pull-up module comprises an eighth transistor, the eighth transistor is configured to output the scan signal of the gate driving unit in the current stage through the output terminal of the gate driving unit in the current stage according to the potential of the first node of the gate driving unit in the current stage and the clock signal transmitted by the clock signal line.

The staging module comprises a ninth transistor, the ninth transistor is configured to provide the staging signal to the start-up signal terminal of the gate driving unit in the subsequent stage through the staging signal terminal of the gate driving unit in the current stage according to the potential of the first node of the gate driving unit in the current stage and the clock signal transmitted by the clock signal line.

The pull-down module comprises a tenth transistor and an eleventh transistor, the tenth transistor is configured to transmit the first voltage signal supplied by the first voltage terminal to the first node of the gate driving unit in the current stage according to the scan signal output by the output terminal of the gate driving unit in next six stage; the eleventh transistor is configured to transmit the first voltage signal supplied by the first voltage terminal to the output terminal of the gate driving unit in the current stage according to the scan signal output by the output terminal of the gate driving unit in the next six stage.

The bootstrap module comprises a capacitor, and the capacitor is connected in series between the first node of the gate driving unit in the current stage and the output terminal of the gate driving unit in the current stage.

Embodiments of the present application further provide a display panel comprising a plurality of scan lines, a plurality of data lines, a plurality of sub-pixels, and a gate driving circuit.

The plurality of scan lines are configured to transmit a plurality of scan signals, and the plurality of data lines are configured to transmit a plurality of data signals. The plurality of sub-pixels comprise a plurality of pixel driving circuits, and the plurality of the pixel driving circuits are electrically connected to the plurality of the data lines and the plurality of the scan lines. The gate driving circuit comprises a plurality of cascaded gate driving units, and the plurality of the scan lines are electrically connected with output terminals of the plurality of the gate driving units.

At least one of the gate driving units comprises a first transistor, a second transistor, a third transistor, an eighth transistor, and an eleventh transistor, a gate of the first transistor is electrically connected to a second node of the gate driving unit in a current stage, a source and a drain of the first transistor are electrically connected to a first voltage terminal and a first node of the gate driving unit in the current stage, a gate of the second transistor is electrically connected to the first node of the gate driving unit in a previous stage, a source and a drain of the second transistor are electrically connected to the first voltage terminal and the second node of the gate driving unit in the current stage; a gate of the third transistor is electrically connected to a start-up signal terminal of the gate driving unit in the current stage, a source and a drain of the third transistor are electrically connected between a pre-charge signal terminal of the gate driving unit in the current stage and the first node of the gate driving unit in the current stage; a gate of the eighth transistor is electrically connected to the first node of the gate driving unit in the current stage, a source and a drain of the eighth transistor are electrically connected between an output terminal of the gate driving unit and a clock signal line in the current stage, a gate of the eleventh transistor is electrically connected to the output terminal of the gate driving unit of a subsequent stage, a source and a drain of the eleventh transistor are electrically connected between the first voltage terminal and the output terminal of the gate driving unit in the current stage.

Before the third transistor transmits a pre-charge signal received by the pre-charge signal terminal to the first node of the gate driving unit in the current stage, the second transistor transmits the first voltage signal supplied by the first voltage terminal to the second node of the gate driving unit in the current stage according to a potential of the first node of the gate driving unit in the previous stage.

Optionally, in some embodiments of the present application, the gate of the second transistor is electrically connected to the first node of the gate driving unit in the first two stage.

Optionally, in some embodiments of the present application, at least one of the gate driving units further comprises a fourth transistor, a fifth transistor, a sixth transistor, and a seventh transistor.

A gate of the fourth transistor is electrically connected to the second node of the gate driving unit in the current stage, a source and a drain of the fourth transistor are electrically connected between the first voltage terminal and the output terminal of the gate driving unit in the current stage, a gate of the fifth transistor is electrically connected to the first node of the gate driving unit in the current stage, a gate of the sixth transistor and one of a source and a drain of the sixth transistor are electrically connected to a second voltage terminal, a source and a drain of the fifth transistor are electrically connected between the first voltage terminal and a gate of the seventh transistor, another of the source and the drain of the sixth transistor is electrically connected to the gate of the seventh transistor, and the source and the drain of the seventh transistor are electrically connected between the second voltage terminal and the second node of the gate driving unit in the current stage.

Optionally, in some embodiments of the present application, at least one of the gate driving units further comprises a ninth transistor, a tenth transistor, and a capacitor.

A gate of the ninth transistor is electrically connected to the first node of the gate driving unit in the current stage, a source and a drain of the ninth transistor are electrically connected between a staging signal terminal of the gate driving unit in the current stage and the clock signal line. A gate of the tenth transistor is electrically connected to the output terminal of the gate driving unit in the subsequent stage, a source and a drain of the tenth transistor are electrically connected between the first node and the first voltage terminal of the gate driving unit in the current stage. The capacitor is connected in series between the first node of the gate driving unit in the current stage and the output terminal of the gate driving unit in the current stage.

The present application further provides a display device including a driving chip and any one of the above gate driving circuits or any one of the above display panels. The driving chip and the gate driving circuit are electrically connected.

Compared with the prior art, the present application provides a gate driving circuit, a display panel, and a display device. The gate driving circuit includes a plurality of cascaded gate driving units. At least one of the gate driving units comprises a pull-up control module, a node pull-down maintaining module, and an inverter module. The pull-up control module is configured to transmit a pre-charge signal received by a pre-charge signal terminal of the gate driving unit in a current stage to a first node of the gate driving unit in the current stage according to a start-up control signal received by a startup signal terminal of the gate driving unit in the current stage. The node pull-down maintaining module is electrically connected to a first voltage terminal, the first node of the gate driving unit in the current stage, and a second node of the gate driving unit in the current stage. The node pull-down maintaining module comprises a first transistor, the first transistor is configured to transmit a first voltage signal supplied by the first voltage terminal to the first node of the gate driving unit in the current stage according to a potential of the second node of the gate driving unit in the current stage. The inverter module is electrically connected to the first voltage terminal, the second node of the gate driving unit in the current stage, and the first node of the gate driving unit in a previous stage; wherein the inverter module comprises a second transistor, the second transistor is configured to transmit the first voltage signal supplied by the first voltage terminal to the second node of the gate driving unit in the current stage according to a potential of the first node of the gate driving unit in the previous stage before transmitting the pre-charge signal to the first node of the gate driving unit in the current stage. Both the display panel and the display device include gate driving circuits. Because before the pre-charge signal is transmitted to the first node of the gate driving unit in the current stage, the first voltage signal supplied by the first voltage terminal is transmitted to the second node of the gate driving unit in the current stage through the second transistor. Therefore, the potential of the second node of the gate driving unit in the current stage can be pulled down before the first node of the gate driving unit in the current stage starts to be pre-charged, that is, before the potential of the first node of the gate driving unit in the current stage rises, when the potential of the first node of the gate driving unit in the current stage rises, the potential of the second node of the gate driving unit in the current stage has been pulled down in advance, in the process of rising of the potential of the first node of the gate driving unit in the current stage, an overlapping voltage value of the potential of the first node and the potential of the second node of the gate driving unit in the current stage can be reduced. Thereby, the issue that the pre-charge effect of the first node potential is affected due to the large coincidence voltage value during the process of the rising of the first node potential and the drop of the second node potential is improved.

DETAILED DESCRIPTION

In order to make the objectives, technical solutions, and effects of the present application clearer and clearer, the present application will be described in further detail below with reference to the accompanying drawings and examples. It should be understood that the specific embodiments described herein are only used to explain the present application, but not to limit the present application.

Figure 1:
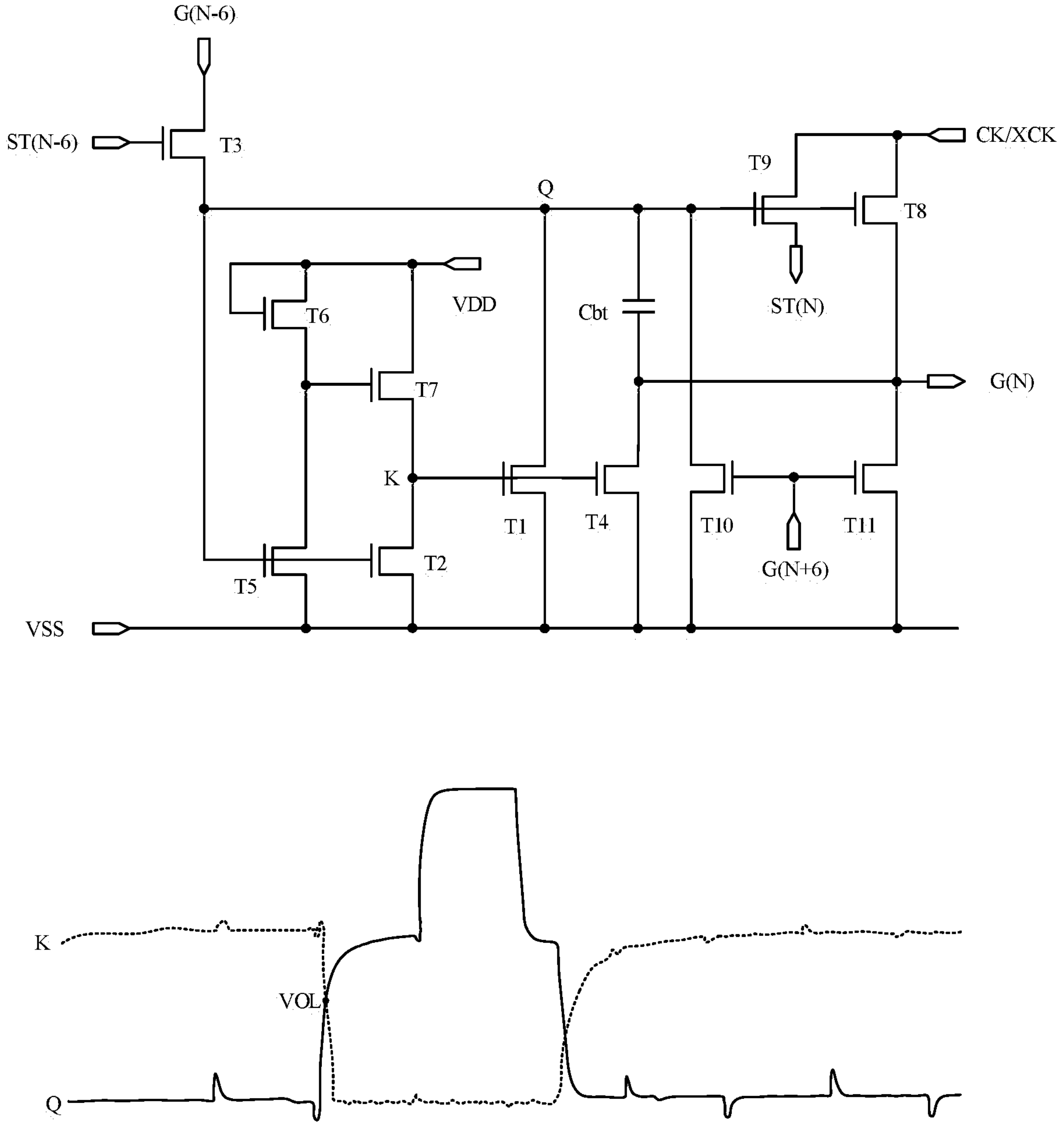
FIG. 1 is a schematic structural diagram and a timing control diagram of a gate driving unit in the prior art.
Figure 2:
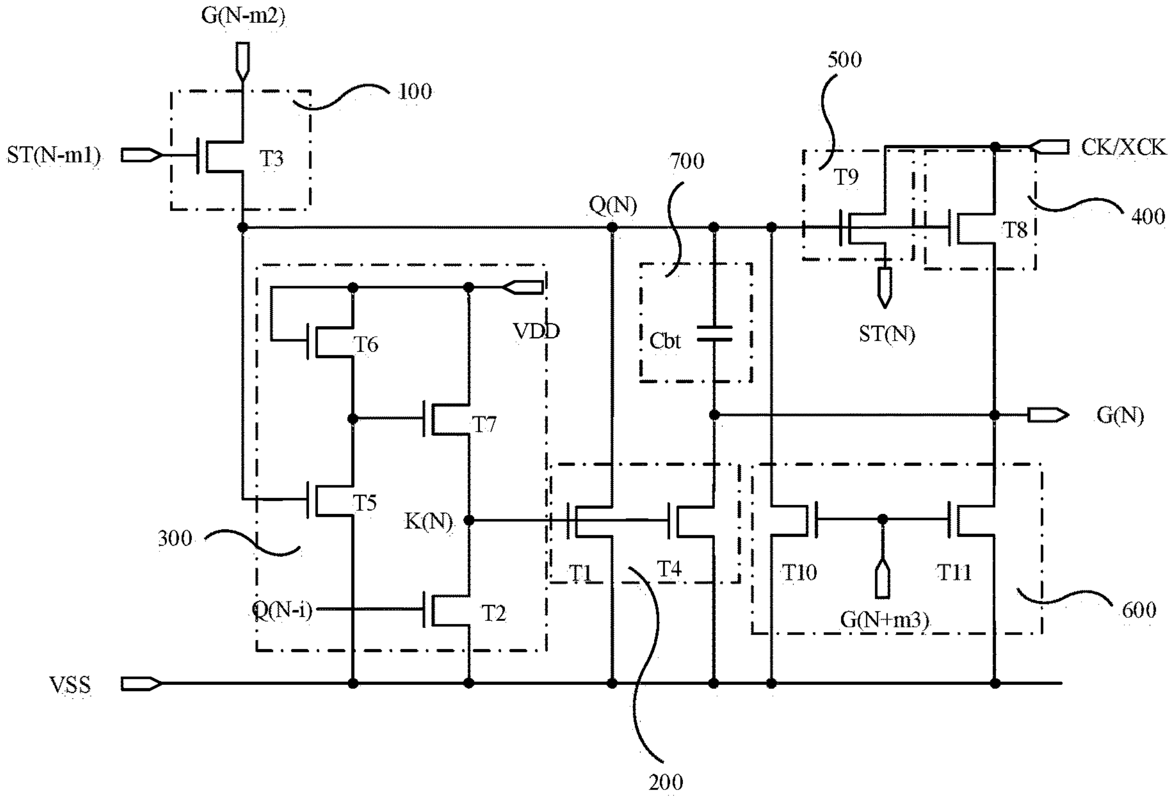
FIG. 2 is a schematic structural diagram of a gate driving unit provided by an embodiment of the present application.
Figure 3:
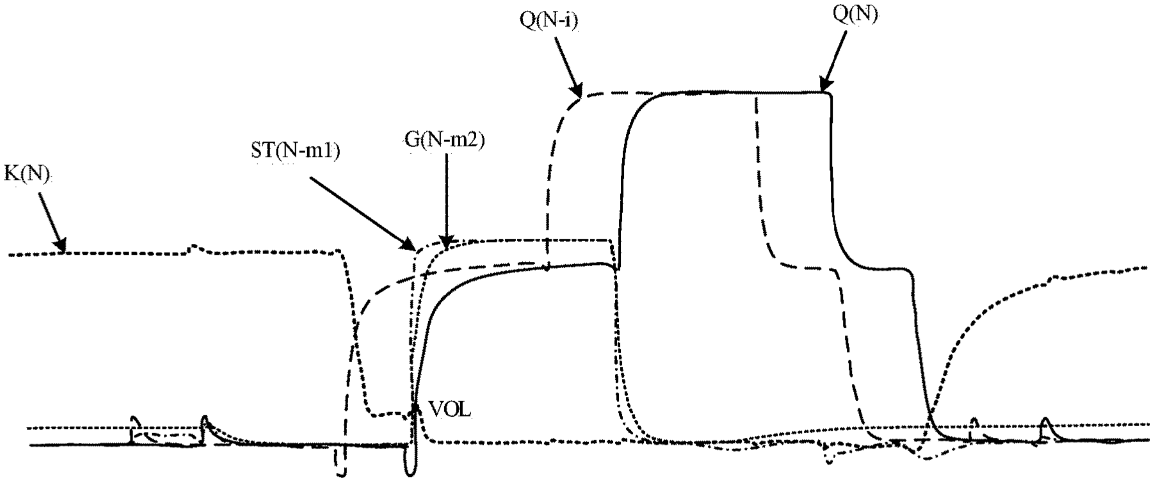
FIG. 3 is a sequence diagram of a first node and a second node provided by an embodiment of the present application.

FIG. 2 is a schematic structural diagram of a gate driving circuit provided by an embodiment of the present application, and FIG. 3 is a timing diagram of a first node and a second node provided by an embodiment of the present application. Embodiments of the present application provide a gate driving circuit, which includes a plurality of cascaded gate driving units. Optionally, the plurality of cascaded gate driving units may be cascaded in the form of interlace cascade or row by row cascade.

The pull-up control module 100 is configured to transmit a pre-charge signal received by a pre-charge signal terminal of the gate driving unit in a current stage to a first node of the gate driving unit in the current stage according to a start-up control signal received by a start-up signal terminal of the gate driving unit in the current stage. Specifically, taking the gate driving unit in the Nth stage as an example, the pull-up control module 100 of the gate driving unit in the Nth stage is configured to transmit the pre-charge signal G(N−m2) received by the pre-charge signal terminal of the gate driving unit in the Nth stage to the first node Q(N) according to the start-up control signal ST(N−m1) received by the start-up signal terminal of the gate driving unit in the Nth stage, where $N \geq 1$, $m1 \geq 1$, $m2 \geq 1$. Optional, m1=m2.

The node pull-down maintaining module 200 is electrically connected to the first voltage terminal VSS, the first node of the gate driving unit in the current stage, and the second node of the gate driving unit in the current stage. The node pull-down maintaining module 200 includes a first transistor T1. A gate of the first transistor T1 is electrically connected to the second node of the gate driving unit in the current stage. A source and a drain of the first transistor T1 are electrically connected to a first voltage terminal VSS and the first node of the gate driving unit in the current stage. The first transistor T1 is used to transmit a first voltage signal supplied by the first voltage terminal VSS to the first node of the gate driving unit in the current stage according to the potential of the second node of the gate drive unit in the current stage.

Specifically, still taking the gate driving unit in the Nth stage as an example, the gate of the first transistor T1 included in the node pull-down maintaining module 200 of the gate driving unit in the Nth stage is electrically connected to the second node K(N) of the gate driving unit in the Nth stage. The source and the drain of the first transistor T1 are electrically connected to the first voltage terminal VSS and the first node Q(N) of the gate driving unit in the Nth stage. The first transistor T1 is used to transmit the first voltage signal supplied by the first voltage terminal VSS to the first node Q(N) of the gate driving unit in the Nth stage according to the potential of the second node K(N) of the gate driving unit in the Nth stage.

The inverter module 300 is electrically connected to the first voltage terminal VSS, the second node of the gate driving unit in the current stage, and the first node of the gate driving unit in a previous stage. The inverter module 300 includes a second transistor T2. The gate of the second transistor T2 is electrically connected to the first node of the gate driving unit in the previous stage. The source and the drain of the second transistor T2 are electrically connected to the first voltage terminal VSS and the second node of the gate driving unit in the current stage. The second transistor T2 is used to transmit the first voltage signal supplied by the first voltage terminal VSS to the second node of the gate driving unit in the current stage according to the potential of the first node of the gate driving unit in the previous stage. Before transmitting the pre-charge signal G(N−m2) to the first node of the gate driving unit in the current stage, the potential of the second node of the gate driving unit in the current stage is pulled down. When the potential of the first node of the gate driving unit in the current stage rises, the potential of the second node of the gate driving unit in the current stage has been pulled down in advance, such that in the process of the potential rise of the first node of the gate driving unit in the current stage, the overlapping voltage value of the potential of the first node and the potential of the second node of the gate driving unit in the current stage (as shown by VOL in FIG. 3) is reduced. Thereby, the issue that the pre-charge effect of the first node potential is affected due to the large coincidence voltage value during the process of the rise of the first node potential and the drop of the second node potential is improved.

Specifically, still taking the gate driving unit in the Nth stage as an example, the gate of the second transistor T2 included in the inverter module 300 of the gate driving unit in the Nth stage is electrically connected to the first node Q(N−i) of the gate driving unit in the Nth stage. The source and the drain of the second transistor T2 are electrically connected to the first voltage terminal VSS and the second node K(N) of the gate driving unit in the Nth stage. Before the pull-up control module 100 of the gate driving unit in the Nth stage transmits the pre-charge signal G(N−m2) received at the pre-charge signal terminal of the gate driving unit in the Nth stage to the first node Q(N) of the gate driving unit in the Nth stage, the second transistor T2 included in the inverter module 300 of the gate driving unit in the Nth stage transmits the first voltage signal supplied by the first voltage terminal VSS to the second node K(N) of the gate driving unit in the Nth stage. Before the first node Q(N) of the gate driving unit in the Nth stage starts to be pre-charged, the potential of the second node K(N) of the gate driving unit in the Nth stage is pulled down. When the potential of the first node Q(N) of the gate driving unit in the Nth stage rises, the potential of the second node K(N) of the gate driving unit in the Nth stage has been pulled down in advance. During the process of increasing the potential of the first node Q(N) of the gate driving unit in the Nth stage, the overlapping voltage value of the potential of the first node Q(N) and the potential of the second node K(N) of the gate driving unit in the Nth stage may decrease. Thereby, the issue that the pre-charge effect of the potential of the first node Q(N) is affected due to the large coincidence voltage value during the process of the rise of the potential of the first node Q(N) and the drop of the potential of the second node K(N) of the gate driving unit in the Nth stage is improved, where i≥1.

Optionally, the second transistor T2 transmits the first voltage signal supplied by the first voltage terminal VSS to the second node of the gate driving unit in the current stage according to the potential of the first node of the gate driving unit in the first two stages. Specifically, still taking the driving unit in the Nth stage as an example, the gate of the second transistor T2 is electrically connected to the first node Q(N−2) of the driving unit in the N−2th stage. The second transistor T2 of the driving unit in the Nth stage transmits the first voltage signal supplied from the first voltage terminal VSS to the second node K(N) of the driving unit in the Nth stage according to the potential of the first node Q(N−2) of the gate driving unit in the N−2th stage. Due to the potential change of the first node Q(N−2) of the gate driving unit in the N−2th stage, the potential of the first node of the gate driving unit in the N−1th stage changes before the potential change. Therefore, it can be effectively ensured that before the pre-charge signal G(N−m2) received at the pre-charge signal terminal of the gate driving unit in the Nth stage is transmitted to the first node Q(N) of the gate driving unit in the Nth stage, the pull-down of the potential of the second node K(N) of the gate driving unit in the Nth stage is realized. In addition, because the second node K(N) of the gate driving unit in the Nth stage is in a low level state, the first transistor T1 remains in an off state. This makes the gate of the second transistor T2 of the gate driving unit in the Nth stage electrically connected to the first node Q(N−2) of the gate driving unit in the N−2th stage. This can keep the first transistor T1 of the gate driving unit in the Nth stage off for too long, so as to avoid affecting the function of the first transistor T1.

Optionally, the start-up control signal ST(N−m1) is a staging signal of the gate driving unit in the first six stage. The pre-charge signal G(N−m2) is a scan signal output by the output terminal of the gate driving unit in the first six stage. The pull-up control module 100 includes a third transistor T3. The gate of the third transistor T3 is electrically connected to the start-up signal terminal of the gate driving unit in the current stage. The source and the drain of the third transistor T3 are electrically connected between the pre-charge signal terminal of the gate driving unit in the current stage and the first node of the gate driving unit in the current stage. The third transistor T3 is used to transmit the scan signal G(N−m2) output from the output terminal of the gate driving unit in the first six stage to the first node of gate driving unit in the current stage according to the staging signal ST(N−m1) of the gate driving unit in the first six stage.

Specifically, still taking the gate driving unit in the Nth stage as an example, the activation signal terminal of the gate driving unit in the Nth stage is electrically connected to the staging signal terminal of the gate driving unit in the N−6th stage. The staging signal terminal of the gate driving unit in the N−6th stage provides the staging signal ST(N−6) of the gate driving unit in the N−6th stage. The pre-charge signal terminal of the gate driving unit in the Nth stage is electrically connected to the output terminal of the gate driving unit in the N−6th stage. The output terminal of the gate driving unit in the N−6th stage outputs the scan signal G(N−6) of the gate driving unit in the N−6th stage. That is, m1=m2=6. The third transistor T3 of the gate driving unit in the Nth stage transmits the scan signal G(N−6) output by the gate driving unit in the N−6th stage to the first node Q(N) of the gate driving unit in the Nth stage according to the staging signal ST(N−6) of the gate driving unit in the N−6th stage.

Please continue to refer to FIG. 3, the part of Q(N−i) before the action time of ST(N−m1) can turn on the second transistor T2 of the gate driving unit in the current stage, thereby the potential of the second node of the gate driving unit in the current stage is pulled down.

Optionally, please continue to refer to FIG. 2, the node pull-down maintaining module 200 is further electrically connected to the output terminal of the gate driving unit in the current stage. The node pull-down maintaining module 200 further includes a fourth transistor T4. The gate of the fourth transistor T4 is electrically connected to the second node of the gate driving unit in the current stage. The source and the drain of the fourth transistor T4 are electrically connected between the first voltage terminal VSS and the output terminal of the gate driving unit in the current stage. The fourth transistor T4 is used to transmit the first voltage signal supplied by the first voltage terminal VSS to the output terminal of the gate driving unit in the current stage according to the potential of the second node of the gate driving unit in the current stage.

Specifically, still taking the gate driving unit in the Nth stage as an example, the gate of the fourth transistor T4 included in the node pull-down maintaining module 200 of the gate driving unit in the Nth stage is electrically connected to the second node K(N) of the gate driving unit in the Nth stage. The source and the drain of the fourth transistor T4 are electrically connected between the first voltage terminal VSS and the output terminal of the gate driving unit in the Nth stage. The fourth transistor T4 included in the node pull-down sustaining module 200 of the gate driving unit in the Nth stage transmits the first voltage signal supplied by the first voltage terminal VSS to the output terminal of the gate driving unit in the Nth stage according to the potential of the second node K(N) of the gate driving unit in the Nth stage.

Optionally, the inverter module 300 is further electrically connected to the second voltage terminal VDD. The inverter module 300 further includes a fifth transistor T5, a sixth transistor T6, and a seventh transistor T7. The gate of the fifth transistor T5 is electrically connected to the first node of the gate driving unit in the current stage. The gate of the sixth transistor T6 and one of the source and the drain of the sixth transistor T6 are electrically connected to the second voltage terminal VDD. The source and the drain of the fifth transistor T5 are electrically connected between the first voltage terminal VSS and the gate of the seventh transistor T7. The other one of the source and the drain of the sixth transistor T6 is electrically connected to the gate of the seventh transistor T7. The source and the drain of the seventh transistor T7 are electrically connected between the second voltage terminal VDD and the second node of the gate driving unit in the current stage. The fifth transistor T5 is used to transmit the first voltage signal supplied by the first voltage terminal VSS to the gate of the seventh transistor T7 and the source and the drain of the sixth transistor T6 according to the potential of the first node of the gate driving unit in the current stage. The sixth transistor T6 is used to transmit the second voltage signal supplied by the second voltage terminal VDD to the gate of the seventh transistor T7 according to the second voltage signal supplied by the second voltage terminal VDD, and the sixth transistor T6 transmits the second voltage signal supplied by the second voltage terminal VDD to the second node of the gate driving unit in the current stage through the seventh transistor T7.

Specifically, still taking the gate driving unit in the Nth stage as an example, the gate of the fifth transistor T5 of the gate driving unit in the Nth stage is electrically connected to the first node Q(N) of the gate driving unit in the Nth stage. The source and the drain of the seventh transistor T7 are electrically connected between the second voltage terminal VDD and the second node K(N) of the gate driving unit in the Nth stage. The fifth transistor T5 transmits the first voltage signal supplied by the first voltage terminal VSS to the gate of the seventh transistor T7 and one of the source and the drain of the sixth transistor T6 according to the potential of the first node Q(N) of the gate driving unit in the Nth stage. The sixth transistor T6 transmits the second voltage signal supplied by the second voltage terminal VDD to the gate of the seventh transistor T7 according to the second voltage signal supplied by the second voltage terminal VDD. The sixth transistor T6 transmits the second voltage signal supplied by the second voltage terminal VDD to the second node K(N) of the gate driving unit in the Nth stage through the seventh transistor T7.

Optionally, at least one of the gate driving units further includes a pull-up module 400, a staging module 500, a pull-down module 600, and a bootstrap module 700.

The pull-up module 400 is electrically connected to a clock signal line, the first node of the gate driving unit in the current stage, and the output terminal of the gate driving unit in the current stage. The pull-up module 400 is configured to output the scan signal of the gate driving unit in the current stage through the output terminal of the gate driving unit in the current stage according to the potential of the first node of the gate driving unit in the current stage and the clock signal CK/XCK.

Optionally, the pull-up module 400 includes an eighth transistor T8. The gate of the eighth transistor T8 is electrically connected to the first node of the gate driving unit in the current stage. The source and the drain of the eighth transistor T8 are electrically connected between the output terminal of the gate driving unit and the clock signal line in the current stage. The eighth transistor T8 is configured to output the scan signal of the gate driving unit in the current stage through the output terminal of the gate driving unit in the current stage according to the potential of the first node of the gate driving unit in the current stage and the clock signal CK/XCK transmitted by the clock signal line.

Specifically, still taking the gate driving unit in the Nth stage as an example, the gate of the eighth transistor T8 in the gate driving unit in the Nth stage is electrically connected to the first node Q(N) of the gate driving unit in the Nth stage. The source and the drain of the eighth transistor T8 are electrically connected between the output terminal of the gate driving unit in the Nth stage and the clock signal line. The eighth transistor T8 of the gate driving unit in the Nth stage outputs the scan signal G(N) of the gate driving unit in the Nth stage through the output terminal of the gate driving unit in the Nth stage according to the potential of the first node Q(N) of the gate driving unit in the Nth stage and the clock signal CK/XCK transmitted by the clock signal line.

The staging module 500 is electrically connected to the clock signal line, the first node of the gate driving unit in the current stage, and the staging signal terminal of the gate driving unit in the current stage. The staging module 500 is configured to transmit the staging signal to the start-up signal terminal of the gate driving unit in a subsequent stage through the staging signal terminal of the gate driving unit in the current stage according to the potential of the first node of the gate driving unit in the current stage and the clock signal CK/XCK transmitted by the clock signal line.

Optionally, the staging module 500 includes a ninth transistor T9. The gate of the ninth transistor T9 is electrically connected to the first node of the gate driving unit in the current stage. The source and the drain of the ninth transistor T9 are electrically connected between the staging signal terminal of the gate driving unit in the current stage and the clock signal line. The ninth transistor T9 is configured to provide the staging signal to the start-up signal terminal of the gate driving unit in the subsequent stage through the staging signal terminal of the gate driving unit in the current stage according to the potential of the first node of the gate driving unit in the current stage and the clock signal CK/XCK transmitted by the clock signal line.

Specifically, still taking the gate driving unit in the Nth stage as an example, the gate of the ninth transistor T9 in the gate driving unit in the Nth stage is electrically connected to the first node Q(N) of the gate driving unit in the Nth stage. The source and the drain of the ninth transistor T9 are electrically connected between the staging signal terminal of the gate driving unit in the Nth stage and the clock signal line. The ninth transistor T9 of the gate driving unit in the Nth stage provides a staging signal ST(N) in the Nth stage to the start signal terminal of the gate driving unit in the subsequent stage through the staging signal terminal of the gate driving unit in the Nth stage according to the potential of the first node Q(N) of the gate driving unit in the Nth stage and the clock signal CK/XCK transmitted by the clock signal line.

The pull-down module 600 is electrically connected to the first voltage terminal VSS, the first node of the gate driving unit in the current stage, the output terminal of the gate driving unit in the current stage, and the output terminal of the gate drive unit. The pull-down module 600 is configured to transmit the first voltage signal supplied by the first voltage terminal VSS to the first node of the gate driving unit in the current stage and the output terminal of the gate driving unit in the current stage according to the scan signal output by the output terminal of the gate driving unit in the subsequent stage.

Optionally, the pull-down module 600 includes a tenth transistor T10 and an eleventh transistor T11.

The gate of the tenth transistor T10 is electrically connected to the output terminal of the gate driving unit in the subsequent stage. The source and the drain of the tenth transistor T10 are electrically connected between the first node of the gate driving unit in the current stage and the first voltage terminal VSS. The tenth transistor T10 is used to transmit the first voltage signal supplied by the first voltage terminal VSS to the first node of the gate driving unit in the current stage according to the scan signal output by the output terminal of the gate driving unit in the subsequent stage.

The gate of the eleventh transistor T11 is electrically connected to the output terminal of the gate driving unit in the subsequent stage. The source and the drain of the eleventh transistor T11 are electrically connected between the first voltage terminal VSS and the output terminal of the gate driving unit in the current stage. The eleventh transistor T11 is used to transmit the first voltage signal supplied by the first voltage terminal VSS to the output terminal of the gate driving unit in the current stage according to the scan signal output by the output terminal of the gate driving unit in the subsequent stage.

Optionally, the gates of the tenth transistor T10 and the eleventh transistor T11 of the gate driving unit in the current stage are both electrically connected to the output terminal of the gate driving unit in the next six stage.

Specifically, still taking the gate driving unit in the Nth stage as an example, the gates of the tenth transistor T10 and the eleventh transistor T11 of the gate driving unit in the Nth stage are both electrically connected to the output terminal of the gate driving unit in the N+m3th stage. The source and the drain of the tenth transistor T10 are electrically connected between the first node Q(N) of the gate driving unit in the Nth stage and the first voltage terminal VSS. The source and the drain of the eleventh transistor T11 are electrically connected between the first voltage terminal VSS and the output terminal of the gate driving unit in the Nth stage. The tenth transistor T10 of the gate driving unit in the Nth stage transmits the first voltage signal supplied from the first voltage terminal VSS to the first node Q(N) of the gate driving unit in the Nth stage according to the scan signal G(N+m3) in the N+m3th stage output by the output terminal of the gate driving unit in the N+m3th stage. The eleventh transistor T11 of the gate driving unit in the Nth stage transmits the first voltage signal supplied by the first voltage terminal VSS to the output terminal of the gate driving unit in the Nth stage according to the scan signal G(N+m3) in the N+m3th stage output by the output terminal of the gate driving unit in the N+m3th stage, where $m3 \geq 1$.

The bootstrap module 700 is electrically connected to the first node of the gate driving unit in the current stage and the output terminal of the gate driving unit in the current stage. The bootstrap module 700 is configured to bootstrap the potential of the first node of the gate driving unit in the current stage.

Optionally, the bootstrap module 700 includes a capacitor Cbt. The capacitor Cbt is connected in series between the first node of the gate driving unit in the current stage and the output terminal of the gate driving unit in the current stage. Specifically, still taking the gate driving unit in the Nth stage as an example, the capacitor Cbt included in the bootstrap module 700 of the gate driving unit in the Nth stage is connected in series with the first nodes Q(N) and between the output terminal of the gate driving unit in the Nth stage.

Optionally, the node pull-down maintaining module 200 of at least one of the gate driving units further includes a twelfth transistor. The gate of the twelfth transistor is electrically connected to the second node of the gate driving unit in the current stage. The source and the drain of the twelfth transistor are electrically connected to the first voltage terminal VSS and the staging signal terminal of the gate driving unit in the current stage. The twelfth transistor is used to transmit the first voltage signal supplied by the first voltage terminal VSS to the staging signal terminal of the gate driving unit in the current stage according to the potential of the second node of the gate driving unit in the current stage.

Optionally, at least one of the gate driving units may include two of the inverter modules 300 and two of the node pull-down maintaining modules 200. The two inverter modules 300 and the two node pull-down maintaining modules 200 cooperate with each other to work in turn. Correspondingly, when the gate driving unit includes two of the inverter modules 300 and two of the node pull-down maintaining modules 200, the gate driving unit includes two of the second nodes. The two inverter modules 300 may be symmetrically arranged, and phases of the second voltage signals output by the second voltage terminals VDD electrically connected to the two inverter modules 300 are opposite. The two node pull-down maintaining modules 200 are arranged symmetrically.

Embodiments of the present application further provide a display panel including any of the above gate driving units.

Figure 4:
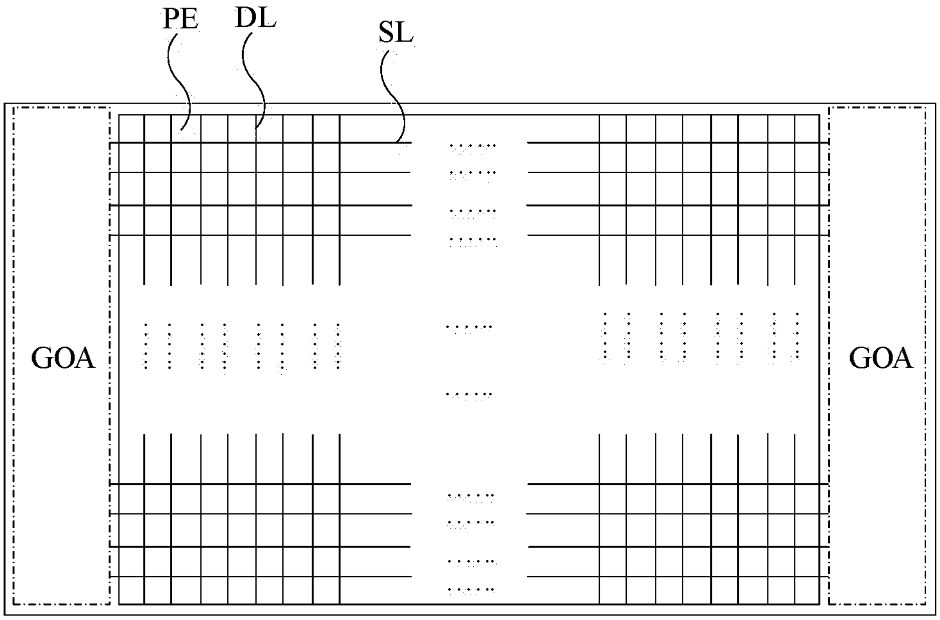
FIG. 4 is a schematic structural diagram of a display panel provided by an embodiment of the present application.
Figure 5:
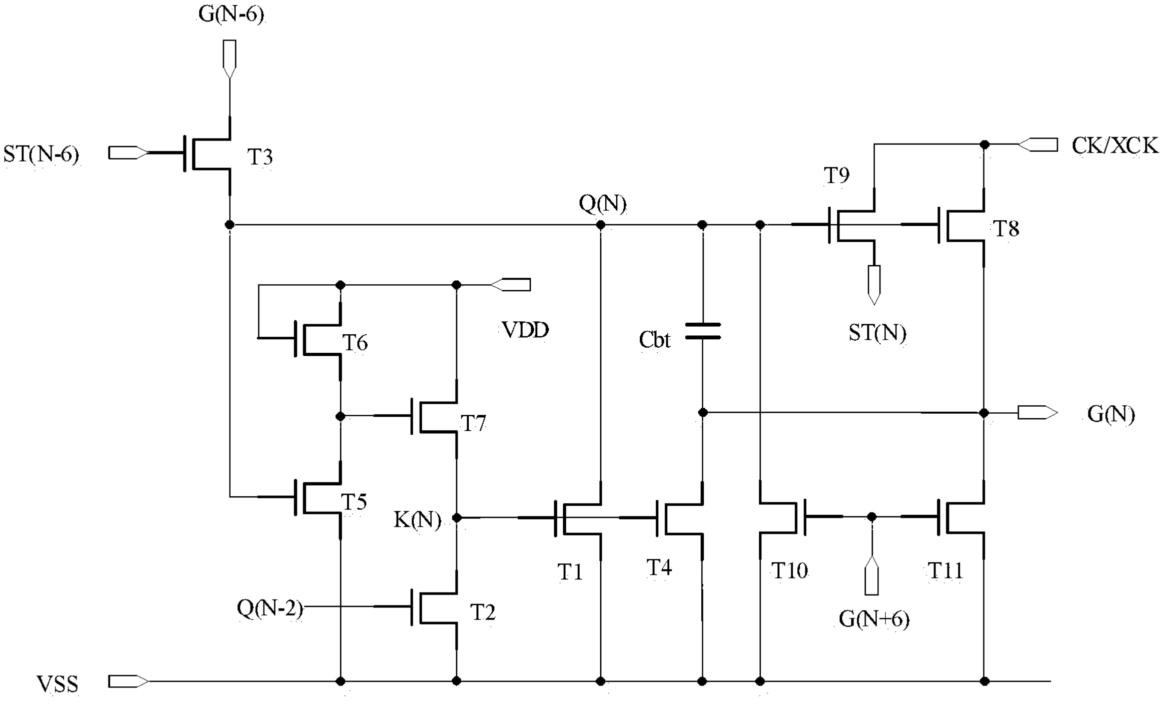
FIG. 5 is a schematic structural diagram of a gate driving unit provided by an embodiment of the present application.

FIG. 4 is a schematic structural diagram of a display panel provided by an embodiment of the present application. FIG. 5 is a schematic structural diagram of a gate driving unit provided by an embodiment of the present application. The present application also provides a display panel. Optionally, the display panel includes a liquid crystal display panel, a self-luminous display panel, a quantum dot display panel, and the like.

The display panel includes a plurality of scan lines SL, a plurality of data lines DL, a plurality of sub-pixels PE, and a gate driving circuit GOA.

A plurality of the scan lines SL transmit a plurality of scan signals. A plurality of the data lines transmit a plurality of data signals. A plurality of the sub-pixels PE includes a plurality of pixel driving circuits. The plurality of pixel driving circuits are electrically connected to the plurality of the data lines DL and the plurality of the scan lines SL. The gate driving circuit GOA includes a plurality of cascaded gate driving units. The plurality of scan lines SL are electrically connected to the output terminals of the plurality of gate driving units. Optionally, a plurality of the sub-pixels PE are located in the display area of the display panel. The gate driving circuit GOA is located in the non-display area of the display panel.

At least one of the gate driving units includes a first transistor T1, a second transistor T2, a third transistor T3, an eighth transistor T8, and an eleventh transistor T11.

The gate of the first transistor T1 is electrically connected to the second node of the gate driving unit in the current stage. The source and the drain of the first transistor T1 are electrically connected to the first voltage terminal VSS and the first node of the gate driving unit in the current stage.

The gate of the second transistor T2 is electrically connected to the first node of the gate driving unit in the preceding stage. The source and the drain of the second transistor T2 are electrically connected to the first voltage terminal VSS and the second node of the gate driving unit in the current stage.

The gate of the third transistor T3 is electrically connected to the start-up signal terminal of the gate driving unit in the current stage. The source and the drain of the third transistor T3 are electrically connected between the pre-charge signal terminal of the gate driving unit in the current stage and the first node of the gate driving unit in the current stage. Before the third transistor T3 transmits the pre-charge signal received by the pre-charge signal terminal to the first node of the gate driving unit in the current stage, the second transistor T2 transmits the first voltage signal supplied by the first voltage terminal VSS to the second node of the gate driving unit in the current stage according to the potential of the first node of the gate driving unit in the previous stage. The potential of the second node of the gate driving unit in the current stage is pulled down before the first node of the gate driving unit in the current stage is pre-charged.

Optionally, the gate of the second transistor T2 is electrically connected to the first node of the gate driving unit in the first two stage.

Specifically, taking the gate driving unit in the Nth stage as an example, the gate of the first transistor T1 of the gate driving unit in the Nth stage is electrically connected to the second node K(N) of the gate driving unit in the Nth stage. The source and the drain of the first transistor T1 are electrically connected to the first voltage terminal VSS and the first node Q(N) of the gate driving unit in the Nth stage. The gate of the second transistor T2 is electrically connected to the first node Q(N−i) of the gate driving unit in the N-ith stage. The source and the drain of the second transistor T2 are electrically connected to the first voltage terminal VSS and the second node K(N) of the gate driving unit in the Nth stage, where i≥1. Further, the gate of the second transistor T2 is electrically connected to the first node Q(N−2) of the gate driving unit in the N−2th stage. The gate of the third transistor T3 is electrically connected to the start-up signal terminal of the gate driving unit in the Nth stage. The source and the drain of the third transistor T3 are electrically connected between the pre-charge signal terminal of the gate driving unit in the Nth stage and the first node Q(N) of the gate driving unit in the Nth stage.

Optionally, the start-up control signal ST(N−m1) received by the start-up signal terminal of the gate driving unit in the Nth stage is the staging signal ST(N−6). The pre-charge signal G(N−m2) received by the pre-charge signal terminal of the gate driving unit in the Nth stage is the scan signal G(N−6) in the N−6th stage output by the output terminal of the gate driving unit in the N−6th stage. It can be understood that m1 and m2 can also be other integers.

The gate of the eighth transistor T8 is electrically connected to the first node of the gate driving unit in the current stage. The source and the drain of the eighth transistor T8 are electrically connected between the output terminal of the gate driving unit and the clock signal line in the current stage. The clock signal CK/XCK is transmitted by the clock signal line.

The gate of the eleventh transistor T11 is electrically connected to the output terminal of the gate driving unit in the subsequent stage. The source and the drain of the eleventh transistor T11 are electrically connected between the first voltage terminal VSS and the output terminal of the gate driving unit in the current stage.

Specifically, still taking the gate driving unit in the Nth stage as an example, the gate of the eighth transistor T8 of the gate driving unit in the Nth stage is electrically connected to the first node Q(N) of the gate driving unit in the Nth stage. The source and the drain of the eighth transistor T8 are electrically connected between the output terminal of the gate driving unit in the Nth stage and the clock signal line. The gate of the eleventh transistor T11 is electrically connected to the output terminal of the gate driving unit in the N+m3 stage. The source and the drain of the eleventh transistor T11 are electrically connected between the first voltage terminal VSS and the output terminal of the gate driving unit in the Nth stage.

Optionally, at least one of the gate driving units further includes a fourth transistor T4, a fifth transistor T5, a sixth transistor T6, and a seventh transistor T7.

The gate of the fourth transistor T4 is electrically connected to the second node of the gate driving unit in the current stage. The source and the drain of the fourth transistor T4 are electrically connected between the first voltage terminal VSS and the output terminal of the gate driving unit in the current stage. The gate of the fifth transistor T5 is electrically connected to the first node of the gate driving unit in the current stage. The gate of the sixth transistor T6 and one of the source and the drain of the sixth transistor T6 are electrically connected to the second voltage terminal VDD. The source and the drain of the fifth transistor T5 are electrically connected between the first voltage terminal VSS and the gate of the seventh transistor T7. The other one of the source and the drain of the sixth transistor T6 is electrically connected to the gate of the seventh transistor T7. The source and the drain of the seventh transistor T7 are electrically connected between the second voltage terminal VDD and the second node of the gate driving unit in the current stage.

Specifically, still taking the gate driving unit in the Nth stage as an example, the gate of the fourth transistor T4 of the gate driving unit in the Nth stage is electrically connected to the second node K(N) of the gate driving unit in the Nth stage. The source and the drain of the fourth transistor T4 are electrically connected between the first voltage terminal VSS and the output terminal of the gate driving unit in the Nth stage. The gate of the fifth transistor T5 is electrically connected to the first node Q(N) of the gate driving unit in the Nth stage. The source and the drain of the seventh transistor T7 are electrically connected between the second voltage terminal VDD and the second node K(N) of the gate driving unit in the Nth stage.

Optionally, at least one of the gate driving units further includes a ninth transistor T9, a tenth transistor T10, and a capacitor Cbt.

The gate of the ninth transistor T9 is electrically connected to the first node of the gate driving unit in the current stage. The source and the drain of the ninth transistor T9 are electrically connected between the staging signal terminal of the gate driving unit in the current stage and the clock signal line. The gate of the tenth transistor T10 is electrically connected to the output terminal of the gate driving unit in the subsequent stage. The source and the drain of the tenth transistor T10 are electrically connected between the first node of the gate driving unit in the current stage and the first voltage terminal VSS. The capacitor Cbt is connected in series between the first node of the gate driving unit in the current stage and the output terminal of the gate driving unit in the current stage.

Specifically, still taking the gate driving unit in the Nth stage as an example, the gate of the ninth transistor T9 of the gate driving unit in the Nth stage is electrically connected to the first node Q(N) of the gate driving unit in the Nth stage. The source and the drain of the ninth transistor T9 are electrically connected between the staging signal terminal of the gate driving unit in the Nth stage and the clock signal line. The gates of the tenth transistor T10 and the eleventh transistor T11 are both electrically connected to the output terminal of the gate driving unit in the N+m3th stage. The source and the drain of the tenth transistor T10 are electrically connected between the first node Q(N) of the gate driving unit in the Nth stage and the first voltage terminal VSS. Optionally, the gates of the tenth transistor T10 and the eleventh transistor T11 of the gate driving unit in the Nth stage are both electrically connected to the output terminal of the gate driving unit in the N+6th stage. The output terminal of the gate driving unit in the N+6th stage outputs the scan signal G(N+6) in the N+6th stage. It can be understood that m3 can also be other integers.

Optionally, at least one of the gate driving units may include transistors symmetrical to the first transistor T1, the second transistor T2, the fourth transistor T4, the fifth transistor T5, the sixth transistor T6, and the seventh transistor T7, and details are not described herein again.

Optionally, at least one of the gate driving units further includes a twelfth transistor. The gate of the twelfth transistor is electrically connected to the second node of the gate driving unit in the current stage. The source and the drain of the twelfth transistor are electrically connected to the first voltage terminal and the staging signal terminal of the gate driving unit in the current stage.

The present application further provides a display device including a driving chip and any one of the above gate driving circuits or any one of the above display panels. The driving chip and the gate driving circuit are electrically connected. The driving chip is used to provide a plurality of control signals including a clock signal to the gate driving circuit.

Understandably, the display device includes a movable display device (such as a notebook computer, a mobile phone, etc.), a fixed terminal (such as a desktop computer, a TV, etc.), a measurement device (such as a sports bracelet, a thermometer, etc.), and the like.

Specific examples are used herein to illustrate the principles and implementations of the present application, and the descriptions of the above embodiments are only used to help understand the methods and core ideas of the present application. In addition, for those skilled in the art, according to the idea of the present application, there will be changes in the specific embodiments and application scope. In conclusion, the content of this specification should not be construed as a limitation on the present application.

What is claimed is:

1. A gate driving circuit, comprising a plurality of cascaded gate driving units, at least one of the gate driving units comprising:

a pull-up control module configured to transmit a pre-charge signal received by a pre-charge signal terminal of the gate driving unit in a current stage to a first node of the gate driving unit in the current stage according to a start-up control signal received by a startup signal terminal of the gate driving unit in the current stage;

a node pull-down maintaining module electrically connected to a first voltage terminal, the first node of the gate driving unit in the current stage, and a second node of the gate driving unit in the current stage; wherein the node pull-down maintaining module comprises a first transistor, the first transistor is configured to transmit a first voltage signal supplied by the first voltage terminal to the first node of the gate driving unit in the current stage according to a potential of the second node of the gate driving unit in the current stage; and, an inverter module electrically connected to the first voltage terminal, the second node of the gate driving unit in the current stage, and the first node of the gate driving unit in a previous stage; wherein the inverter module comprises a second transistor, the second transistor is configured to transmit the first voltage signal supplied by the first voltage terminal to the second node of the gate driving unit in the current stage according to a potential of the first node of the gate driving unit in the previous stage before transmitting the pre-charge signal to the first node of the gate driving unit in the current stage.

2. The gate driving circuit of claim 1, wherein the second transistor is configured to transmit the first voltage signal supplied by the first voltage terminal to the second node of the gate driving unit in the current stage according to the potential of the first node of the gate driving unit in first two stage.

3. The gate driving circuit of claim 1, wherein the start-up control signal is a staging signal of first six stage of the gate driving unit, the pre-charge signal is a scan signal output by an output terminal of the gate driving unit in the first six stage, the pull-up control module comprises a third transistor, the third transistor is configured to transmit the scan signal output by the output terminal of the gate driving unit in the first six stage to the first node of the gate driving unit in the current stage according to the staging signal of the gate drive unit in the first six stage.

4. The gate driving circuit of claim 1, wherein the node pull-down maintaining module is further electrically connected to the output terminal of the gate driving unit in the current stage, the node pull-down maintaining module further comprises a fourth transistor, the fourth transistor is configured to transmit the first voltage signal supplied by the first voltage terminal to the output terminal of the gate driving unit of the current stage according to a potential of the second node of the gate driving unit in the current stage.

5. The gate driving circuit of claim 1, wherein:

the inverting module is further electrically connected to a second voltage terminal, the inverting module further comprises a fifth transistor, a sixth transistor, and a seventh transistor; the fifth transistor is configured to transmit the first voltage signal supplied by the first voltage terminal to a gate of the seventh transistor and one of a source and a drain of the sixth transistor according to the potential of the first node of the gate driving unit in the current stage, the sixth transistor is configured to transmit a second voltage signal supplied by the second voltage terminal to the gate of the seventh transistor according to the second voltage signal supplied by the second voltage terminal, and the sixth transistor is configured to transmit the second voltage signal supplied by the second voltage terminal to the second node through the seventh transistor.

6. The gate driving circuit of claim 3, wherein each of the gate driving units further comprises:

a pull-up module electrically connected to a clock signal line, the first node of the gate driving unit in the current stage, and the output terminal of the gate driving unit of the current stage and configured to output the scan signal through the output terminal of the gate driving unit in the current stage according to the potential of the first node of the gate driving unit in the current stage and a clock signal transmitted by the clock signal line;

a staging module electrically connected to the clock signal line, the first node of the gate driving unit in the current stage, and a staging signal terminal of the gate driving unit in the current stage and configured to provide the staging signal to a start-up signal terminal of the gate driving unit in a subsequent stage through the staging signal terminal of the gate driving unit in the current stage according to the potential of the first node of the gate driving unit in the current stage and the clock signal transmitted by the clock signal line;

a pull-down module electrically connected to the first voltage terminal, the first node of the gate driving unit in the current stage, the output terminal of the gate driving unit in the current stage, and the output terminal of the gate driving unit in the subsequent stage and configured to transmit the first voltage signal supplied by the first voltage terminal to the first node of the gate driving unit in the current stage and the output terminal of the gate driving unit in the current stage according to the scan signal output by the output terminal of the gate driving unit in the subsequent stage; and a bootstrap module electrically connected to the first node of the gate driving unit in the current stage and the output terminal of the gate driving unit in the current stage and configured to bootstrap the potential of the first node of the gate driving unit in the current stage.

7. The gate driving circuit of claim 6, wherein:

the pull-up module comprises an eighth transistor, the eighth transistor is configured to output the scan signal of the gate driving unit in the current stage through the output terminal of the gate driving unit in the current stage according to the potential of the first node of the gate driving unit in the current stage and the clock signal transmitted by the clock signal line;

the staging module comprises a ninth transistor, the ninth transistor is configured to provide the staging signal to the start-up signal terminal of the gate driving unit in the subsequent stage through the staging signal terminal of the gate driving unit in the current stage according to the potential of the first node of the gate driving unit in the current stage and the clock signal transmitted by the clock signal line;

the pull-down module comprises a tenth transistor and an eleventh transistor, the tenth transistor is configured to transmit the first voltage signal supplied by the first voltage terminal to the first node of the gate driving unit in the current stage according to the scan signal output by the output terminal of the gate driving unit in next six stage; the eleventh transistor is configured to transmit the first voltage signal supplied by the first voltage terminal to the output terminal of the gate driving unit in the current stage according to the scan signal output by the output terminal of the gate driving unit in the next six stage;

the bootstrap module comprises a capacitor, and the capacitor is connected in series between the first node of the gate driving unit in the current stage and the output terminal of the gate driving unit in the current stage.

8. A display panel, comprising:

a plurality of scan lines configured to transmit a plurality of scan signals;

a plurality of data lines configured to transmit a plurality of data signals;

a plurality of sub-pixels comprising a plurality of pixel driving circuits, wherein the plurality of the pixel driving circuits are electrically connected to the plurality of the data lines and the plurality of the scan lines; and a gate driving circuit comprising a plurality of cascaded gate driving units, wherein the plurality of the scan lines are electrically connected with output terminals of the plurality of the gate driving units; wherein at least one of the gate driving units comprises a first transistor, a second transistor, a third transistor, an eighth transistor, and an eleventh transistor, a gate of the first transistor is electrically connected to a second node of the gate driving unit in a current stage, a source and a drain of the first transistor are electrically connected to a first voltage terminal and a first node of the gate driving unit in the current stage, a gate of the second transistor is electrically connected to the first node of the gate driving unit in a previous stage, a source and a drain of the second transistor are electrically connected to the first voltage terminal and the second node of the gate driving unit in the current stage; a gate of the third transistor is electrically connected to a start-up signal terminal of the gate driving unit in the current stage, a source and a drain of the third transistor are electrically connected between a pre-charge signal terminal of the gate driving unit in the current stage and the first node of the gate driving unit in the current stage; a gate of the eighth transistor is electrically connected to the first node of the gate driving unit in the current stage, a source and a drain of the eighth transistor are electrically connected between an output terminal of the gate driving unit and a clock signal line in the current stage, a gate of the eleventh transistor is electrically connected to the output terminal of the gate driving unit of a subsequent stage, a source and a drain of the eleventh transistor are electrically connected between the first voltage terminal and the output terminal of the gate driving unit in the current stage;

wherein before the third transistor transmits a pre-charge signal received by the pre-charge signal terminal to the first node of the gate driving unit in the current stage, the second transistor transmits the first voltage signal supplied by the first voltage terminal to the second node of the gate driving unit in the current stage according to a potential of the first node of the gate driving unit in the previous stage.

9. The display panel of claim 8, wherein the gate of the second transistor is electrically connected to the first node of the gate driving unit in the first two stage.

10. The display panel of claim 8, wherein at least one of the gate driving units further comprises:

a fourth transistor, wherein a gate of the fourth transistor is electrically connected to the second node of the gate driving unit in the current stage, a source and a drain of the fourth transistor are electrically connected between the first voltage terminal and the output terminal of the gate driving unit in the current stage;

a fifth transistor, wherein a gate of the fifth transistor is electrically connected to the first node of the gate driving unit in the current stage;

a sixth transistor, wherein a gate of the sixth transistor and one of a source and a drain of the sixth transistor are electrically connected to a second voltage terminal; and a seventh transistor, wherein a source and a drain of the fifth transistor are electrically connected between the first voltage terminal and a gate of the seventh transistor, another of the source and the drain of the sixth transistor is electrically connected to the gate of the seventh transistor, and the source and the drain of the seventh transistor are electrically connected between the second voltage terminal and the second node of the gate driving unit in the current stage.

11. The display panel of claim 8, wherein at least one of the gate driving units further comprises:

a ninth transistor, wherein a gate of the ninth transistor is electrically connected to the first node of the gate driving unit in the current stage, a source and a drain of the ninth transistor are electrically connected between a staging signal terminal of the gate driving unit in the current stage and the clock signal line;

a tenth transistor, wherein a gate of the tenth transistor is electrically connected to the output terminal of the gate driving unit in the subsequent stage, a source and a drain of the tenth transistor are electrically connected between the first node and the first voltage terminal of the gate driving unit in the current stage; and a capacitor, wherein the capacitor is connected in series between the first node of the gate driving unit in the current stage and the output terminal of the gate driving unit in the current stage.

12. A display device comprising a driving chip and a gate driving circuit electrically connected to the driving chip, wherein the gate driving circuit comprises a plurality of cascaded gate driving units, at least one of the gate driving units comprises:

a pull-up control module configured to transmit a pre-charge signal received by a pre-charge signal terminal of the gate driving unit in a current stage to a first node of the gate driving unit in the current stage according to a start-up control signal received by a startup signal terminal of the gate driving unit in the current stage;

a node pull-down maintaining module electrically connected to a first voltage terminal, the first node of the gate driving unit in the current stage, and a second node of the gate driving unit in the current stage; wherein the node pull-down maintaining module comprises a first transistor, the first transistor is configured to transmit a first voltage signal supplied by the first voltage terminal to the first node of the gate driving unit in the current stage according to a potential of the second node of the gate driving unit in the current stage; and, an inverter module electrically connected to the first voltage terminal, the second node of the gate driving unit in the current stage, and the first node of the gate driving unit in a previous stage; wherein the inverter module comprises a second transistor, the second transistor is configured to transmit the first voltage signal supplied by the first voltage terminal to the second node of the gate driving unit in the current stage according to a potential of the first node of the gate driving unit in the previous stage before transmitting the pre-charge signal to the first node of the gate driving unit in the current stage.

13. The display device of claim 12, wherein the second transistor is configured to transmit the first voltage signal supplied by the first voltage terminal to the second node of the gate driving unit in the current stage according to the potential of the first node of the gate driving unit in first two stage.

14. The display device of claim 12, wherein the start-up control signal is a staging signal of first six stage of the gate driving unit, the pre-charge signal is a scan signal output by an output terminal of the gate driving unit in the first six stage, the pull-up control module comprises a third transistor, the third transistor is configured to transmit the scan signal output by the output terminal of the gate driving unit in the first six stage to the first node of the gate driving unit in the current stage according to the staging signal of the gate drive unit in the first six stage.

15. The display device of claim 12, wherein the node pull-down maintaining module is further electrically connected to the output terminal of the gate driving unit in the current stage, the node pull-down maintaining module further comprises a fourth transistor, the fourth transistor is configured to transmit the first voltage signal supplied by the first voltage terminal to the output terminal of the gate driving unit of the current stage according to a potential of the second node of the gate driving unit in the current stage.

16. The display device of claim 12, wherein the inverting module is further electrically connected to a second voltage terminal, the inverting module further comprises a fifth transistor, a sixth transistor, and a seventh transistor; the fifth transistor is configured to transmit the first voltage signal supplied by the first voltage terminal to a gate of the seventh transistor and one of a source and a drain of the sixth transistor according to the potential of the first node of the gate driving unit in the current stage, the sixth transistor is configured to transmit a second voltage signal supplied by the second voltage terminal to the gate of the seventh transistor according to the second voltage signal supplied by the second voltage terminal, and the sixth transistor is configured to transmit the second voltage signal supplied by the second voltage terminal to the second node through the seventh transistor.

17. The display device of claim 14, wherein each of the gate driving units further comprises:

a pull-up module electrically connected to a clock signal line, the first node of the gate driving unit in the current stage, and the output terminal of the gate driving unit of the current stage and configured to output the scan signal through the output terminal of the gate driving unit in the current stage according to the potential of the first node of the gate driving unit in the current stage and a clock signal transmitted by the clock signal line;

a staging module electrically connected to the clock signal line, the first node of the gate driving unit in the current stage, and a staging signal terminal of the gate driving unit in the current stage and configured to provide the staging signal to a start-up signal terminal of the gate driving unit in a subsequent stage through the staging signal terminal of the gate driving unit in the current stage according to the potential of the first node of the gate driving unit in the current stage and the clock signal transmitted by the clock signal line;

a pull-down module electrically connected to the first voltage terminal, the first node of the gate driving unit in the current stage, the output terminal of the gate driving unit in the current stage, and the output terminal of the gate driving unit in the subsequent stage and configured to transmit the first voltage signal supplied by the first voltage terminal to the first node of the gate driving unit in the current stage and the output terminal of the gate driving unit in the current stage according to the scan signal output by the output terminal of the gate driving unit in the subsequent stage; and a bootstrap module electrically connected to the first node of the gate driving unit in the current stage and the output terminal of the gate driving unit in the current stage and configured to bootstrap the potential of the first node of the gate driving unit in the current stage.

18. The display device of claim 17, wherein:

the pull-up module comprises an eighth transistor, the eighth transistor is configured to output the scan signal of the gate driving unit in the current stage through the output terminal of the gate driving unit in the current stage according to the potential of the first node of the gate driving unit in the current stage and the clock signal transmitted by the clock signal line;

the staging module comprises a ninth transistor, the ninth transistor is configured to provide the staging signal to the start-up signal terminal of the gate driving unit in the subsequent stage through the staging signal terminal of the gate driving unit in the current stage according to the potential of the first node of the gate driving unit in the current stage and the clock signal transmitted by the clock signal line;

the pull-down module comprises a tenth transistor and an eleventh transistor, the tenth transistor is configured to transmit the first voltage signal supplied by the first voltage terminal to the first node of the gate driving unit in the current stage according to the scan signal output by the output terminal of the gate driving unit in next six stage; the eleventh transistor is configured to transmit the first voltage signal supplied by the first voltage terminal to the output terminal of the gate driving unit in the current stage according to the scan signal output by the output terminal of the gate driving unit in the next six stage;

the bootstrap module comprises a capacitor, and the capacitor is connected in series between the first node of the gate driving unit in the current stage and the output terminal of the gate driving unit in the current stage.

19. The display device of claim 15, wherein the node pull-down maintaining module is further electrically connected to the staging signal terminal of the gate driving unit in the current stage; the node pull-down maintaining module further comprises a twelfth transistor, the twelfth transistor is configured to transmit the first voltage signal supplied by the first voltage terminal to the staging signal terminal of the gate driving unit in the current stage according to a potential of the second node of the gate driving unit in the current stage.

20. The display device of claim 12, further comprising a display panel, wherein the display panel comprises:

a plurality of scan lines configured to transmit a plurality of scan signals;

a plurality of data lines configured to transmit a plurality of data signals;

a plurality of sub-pixels comprising a plurality of pixel driving circuits, wherein the plurality of the pixel driving circuits are electrically connected to the plurality of the data lines and the plurality of the scan lines; and the gate driving circuit, wherein the plurality of the scan lines are electrically connected with output terminals of the plurality of the gate driving units.

* * * * *